United States Patent
Jin et al.

(10) Patent No.: US 9,897,846 B2
(45) Date of Patent: Feb. 20, 2018

(54) LIQUID CRYSTAL DISPLAY DEVICE

(71) Applicant: LG Display Co., Ltd., Seoul (KR)

(72) Inventors: Mokkyu Jin, Daegu (KR); AeKyung Shin, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/276,099

(22) Filed: Sep. 26, 2016

(65) Prior Publication Data

US 2017/0139263 A1    May 18, 2017

(30) Foreign Application Priority Data

Nov. 17, 2015    (KR) .......................... 10-2015-0161412

(51) Int. Cl.
*G02F 1/1335*    (2006.01)
*G02F 1/1345*    (2006.01)
*G02F 1/1368*    (2006.01)
*G02F 1/1333*    (2006.01)

(52) U.S. Cl.
CPC ...... *G02F 1/133512* (2013.01); *G02F 1/1368* (2013.01); *G02F 1/13452* (2013.01); *G02F 1/13454* (2013.01); *G02F 2001/133388* (2013.01)

(58) Field of Classification Search
CPC ............ G02F 1/133512; G02F 1/1368; G02F 1/13452; G02F 1/13439; G02F 1/133509; G02F 2001/136218; H01L 29/78633; H01J 11/44; H01J 2211/444; H01J 2329/323; H01J 29/327; H01J 29/78633; H01J 9/205; G02B 5/20
See application file for complete search history.

(56) References Cited

U.S. PATENT DOCUMENTS

| | | | |
|---|---|---|---|
| 7,113,248 B2 * | 9/2006 | Chung | G02F 1/1339 349/110 |
| 9,316,859 B2 * | 4/2016 | Shin | G02F 1/133512 |
| 2005/0134764 A1 * | 6/2005 | Jeoung | G02F 1/133512 349/110 |
| 2005/0147899 A1 * | 7/2005 | Sun | G02B 5/22 430/7 |
| 2006/0001802 A1 * | 1/2006 | Kao | G02F 1/133512 349/106 |
| 2012/0099061 A1 * | 4/2012 | Lee | G02B 5/22 349/110 |
| 2013/0128193 A1 * | 5/2013 | Yang | G02F 1/133502 349/106 |
| 2017/0062772 A1 * | 3/2017 | Chu | H01L 51/5284 |

* cited by examiner

*Primary Examiner* — Joseph L Williams
*Assistant Examiner* — Jose M Diaz
(74) *Attorney, Agent, or Firm* — Polsinelli PC

(57) ABSTRACT

A liquid crystal display device includes a display panel having an active area and a non-active area; a first black matrix in the active area; a second black matrix on at least a peripheral portion of the display panel and the second black matrix spaced apart from the first black matrix, and the second black matrix positioned in the active area and a portion of the non-active area; and an opaque layer corresponding to a gap between the first black matrix and the second black matrix.

20 Claims, 10 Drawing Sheets

LIQUID CRYSTAL DISPLAY DEVICE

CROSS REFERENCE TO RELATED APPLICATION

This application claims priority from Korean Patent Application Number 10-2015-0161412 filed in the Republic of Korea on Nov. 17, 2015, which is hereby incorporated by reference in its entirety.

BACKGROUND

Field of the Disclosure

The present disclosure relates to a liquid crystal display (LCD) device, and more particularly, to an LCD device that prevents light leakage regardless of viewing angles and a mechanical margin.

Description of the Related Art

In response to the development of the information society, there has been increasing demand for various types of display devices able to display images. Recently, a range of display devices, such as liquid crystal display (LCD) devices, plasma display panels (PDPs), and organic light-emitting diode (OLED) display devices, are in use.

Such a display device may include a top substrate on which a black matrix, a color filter layer, and an overcoat layer are disposed. The color filter layer includes a red (R) color filter layer, a green (G) color filter layer, and a blue (B) color filter layer. The red, green, and blue color filter layers include different dyes or pigments, and includes different amounts of dyes or pigments.

Here, electric charges migrate to a conductive material of the top substrate through electrical lines connected to the ground. Electric charges arrive at and migrate into the overcoat layer that has a low level of resistance. In this case, electrical charges also are transferred to the black matrix having a low level of resistance, and then an electric field is formed in the color filter layer.

In particular, pigments included in the green color filter layer are significantly vulnerable to an electric field, and thus liquid crystal molecules in green subpixels of an LCD display device may malfunction. Thus, even in the case in which no electric field is applied to the green subpixels, liquid crystal molecules disposed in the green subpixels in the surroundings of an active area can be driven by an electric field generated by the black matrix, whereby light leakage may occur.

To prevent such a problem of light leakage, an approach of extending a guide panel, disposed on the rear surface of an LCD panel, toward the surroundings of the active area has been made. In this case, however, light leakage can still occur depending on the viewing angle. Therefore, there is demand for a display device without such problems.

SUMMARY

Various embodiments of the present disclosure provide a liquid crystal display (LCD) device able to prevent light leakage regardless of viewing angles while having a mechanical margin.

According to an aspect of the present disclosure, an LCD device may include: a display panel divided into an active area and a non-active area; a plurality of first black matrices disposed in the active area; a second black matrix disposed on at least one peripheral portion of the display panel to be spaced apart from the plurality of first black matrices, the second black matrix being positioned in the active area and a portion of the non-active area; and a metal layer disposed to correspond to an area between the plurality of first black matrices and the second black matrix.

A gap may be formed between the plurality of first black matrices and the second black matrix, the gap being positioned in the active area. The width of the gap may range from 1 μm to 200 μm.

A metal layer may be disposed to correspond to the gap. The metal layer may be formed of an opaque metal material.

A common voltage supply line and a driver integrated circuit may be disposed on the peripheral portion of the display panel on which the second black matrix is disposed. The common voltage supply line may be disposed on the same layer and formed of the same material as the metal layer.

According to another aspect of the present disclosure, an LCD device may include: a first substrate divided into an active area and a non-active area; a first metal layer or a second metal layer disposed on the first substrate and positioned in an outermost portion of the active area; a second substrate facing the first substrate; a first black matrix disposed on one surface of the second substrate and positioned in the active area; and a second black matrix spaced apart from the first black matrix and positioned in the outermost portion of at least one side of the active area.

According to the present disclosure as set forth above, in the LCD device according to the present embodiments, the first black matrix and the second black matrix are disposed in the outermost portion of the active area to be spaced apart from each other, whereby electric charges transferred from an external source are prevented from being transferred to the first black matrix. It is thereby possible to prevent liquid crystal molecules in the green subpixel from malfunctioning.

In addition, in the LCD device according to the present disclosure, the metal layer is disposed on a portion of the first substrate corresponding to the gap between the first black matrix and the second black matrix. Consequently, the metal layer can absorb light emitted from a backlight unit, thereby preventing light leakage that would otherwise be caused by the gap.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
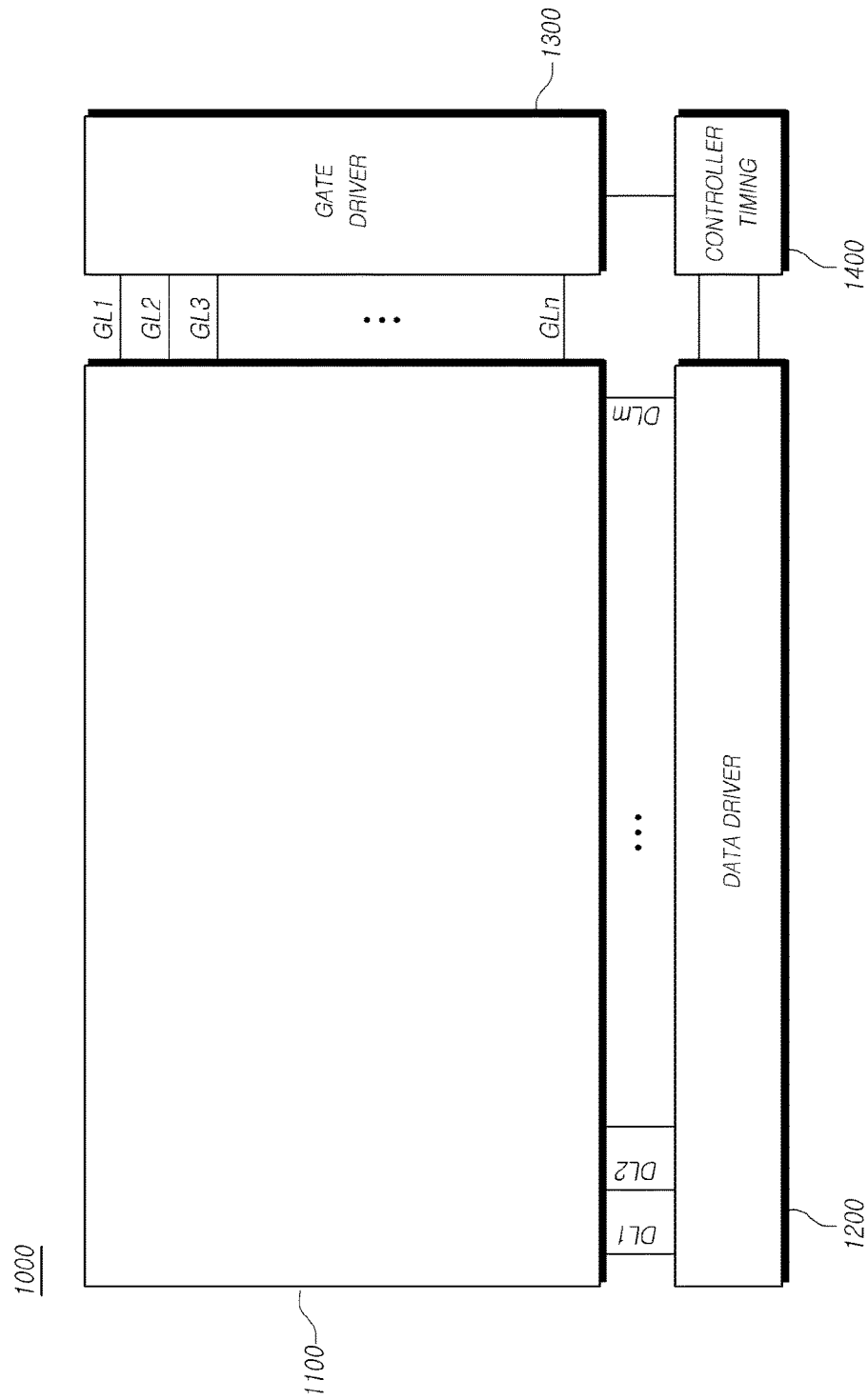
FIG. 1 is a schematic configuration view illustrating a display device according to the present disclosure.

Reference will now be made in detail to embodiments of the present disclosure, examples of which are illustrated in the accompanying drawings. The embodiments set forth herein are provided for illustrative purposes to fully convey the concept of the present disclosure to a person skilled in the art. The present disclosure should not be construed as being limited to these embodiments and may be embodied in many different forms. In the drawings, the size and thickness of the device may be exaggerated for the sake of clarity. Throughout this document, the same reference numerals and signs will be used to designate the same or like components.

The advantages and features of the present disclosure and methods of the realization thereof will be apparent with reference from the accompanying drawings and detailed descriptions of the embodiments. The present disclosure should not be construed to be limited to the embodiments set forth herein and may be embodied in many different forms. Rather, these embodiments are provided so that the present disclosure will be thorough and complete, and will fully convey the scope of the present disclosure to a person skilled in the art. The scope of the present disclosure shall be defined by the appended Claims. Throughout this document, the same reference numerals and signs will be used to designate the same or like components. In the drawings, the sizes and relative sizes of layers and areas may be exaggerated for the sake of clarity.

It will be understood that when an element or a layer is referred to as being "on" another element or layer, not only can it be "directly on" the other element or layer, but it can also be "indirectly on" the other element or layer via an "intervening" element or layer. In contrast, when an element or a layer is referred to as being "directly on" another element or layer, it will be understood that no intervening element or layer is interposed.

Spatially relative terms such as "below," "beneath," "under," "lower," "above," and "upper" may be used herein for the ease of description of the relationship of an element or components to another element or other components as illustrated in the drawings. The spatially relative terms should be construed as terms encompassing different orientations of the element in use or operation in addition to the orientation depicted in the drawings. For example, when elements illustrated in the drawings are turned over, an element described as "below," "beneath" or "under" another element would then be oriented "above" the other element. Thus, the example term "below," "beneath" or "under" can encompass both orientations of above and below.

In addition, terms such as "first," "second," "A," "B," "(a)," and "(b)" may be used herein to describe the components. It should be understood, however, that these terms are only used to distinguish one component from another component and the substance, order, sequence, or number of the components is not limited by these terms.

FIG. 1 is a schematic view illustrating a display device 1000 according to the present disclosure. Referring to FIG. 1, the display device 1000 according to the present disclosure includes a display panel 1100 on which a plurality of data lines DL1 to DLm and a plurality of gate lines GL1 to GLn are disposed and a plurality of subpixels are formed, a data driver circuit 1200 driving the plurality of data lines DL1 to DLm, a gate driver circuit 1300 driving the plurality of gate lines GL1 to GLn, and a timing controller 1400 controlling the data driver circuit 1200, and the gate driver circuit 1300.

The data driver circuit 1200 drives the plurality of data lines by supplying data voltages thereto. The gate driver circuit 1300 sequentially drives the plurality of gate lines by sequentially supplying scanning signals thereto.

In addition, the timing controller 1400 controls the data driver circuit 1200 and the gate driver circuit 1300 by supplying a variety of control signals thereto. The timing controller 1400 starts scanning based on timing realized by each frame, converts image data input by an external source into a data signal format readable by the data driver circuit 1200, outputs the converted image data, and at a suitable point in time, controls data processing in response to the scanning.

The gate driver circuit 1300 sequentially drives the plurality of gate lines by sequentially supplying scanning signals, respectively having an on or off voltage, to the plurality of gate lines under the control of the timing controller 1400. In addition, the gate driver circuit 1300 may be positioned on one side of the display panel 1100, as illustrated in FIG. 1, or on both sides of the display panel 1100 depending on the driving system, the design of the display panel, and so on.

In addition, the gate driver circuit 1300 may include one or more gate driver integrated circuits (ICs). Each of the gate driver ICs may be connected to the bonding pads of the display panel 1100 by a tape automated bonding (TAB) or a chip on glass (COG) process, may be implemented as a gate in panel (GIP)-type IC directly disposed on the display panel 1100, or in some cases, may be integrated with the display panel 1100.

In addition, each of the gate driver ICs may be formed by a chip on film (COF) process. In this case, a gate driver chip corresponding to each of the gate driver ICs may be mounted on a flexible film, and one end of the flexible film may be bonded to the display panel 1100.

When a specific gate line is opened, the data driver circuit 1200 drives the plurality of data lines by converting image data received from the controller 1400 into analog data voltages and supplying the analog data voltages to the plurality of data lines. In addition, the data driver circuit 1200 may include at least one source driver IC to drive the plurality of data lines.

Each of the source driver ICs may be connected to the bonding pads of the display panel 1100 by a TAB or COG process, may be directly disposed on the display panel 1100, or in some cases, may be integrated with the display panel 1100.

In addition, each of the source driver ICs may be formed by a COF process. In this case, a source driver chip corresponding to each of the source driver ICs may be mounted on a flexible film, in which one end of the flexible film is bonded to at least one source printed circuit board (S-PCB) and the other end of the flexible film is bonded to the display panel 1100.

The S-PCB is connected to a control printed circuit board (C-PCB) via a connector, such as a flexible flat cable (FFC) or a flexible printed circuit (FPC). The timing controller 1400 is disposed on the C-PCB.

In addition, a power controller (not shown) may also be disposed on the C-PBC. The power controller serves to supply voltages or currents to the display panel 1100, the data driver circuit 1200, the gate driver circuit 1300, and so on or control voltages or currents to be supplied thereto. The S-PCB and the C-PCB may be integrated as a single PCB.

In the following embodiments, each pixel has at least one subpixel. For example, a single pixel may include two to four subpixels. Colors produced by the subpixels may include red (R), green (G), blue (B), and selectively, white (W), but the present disclosure is not limited thereto.

The display device according to the present disclosure may include a thin-film transistor (TFT) array substrate on which a plurality of TFTs are arranged and a color filter array substrate on which a plurality of color filters are arranged. Thus, the present disclosure may be used in display devices respectively including a TFT array substrate and a color filter array substrate. However, the following embodiments will be described with respect to configurations used in liquid crystal display (LCD) devices, for the sake of brevity.

Figure 2:
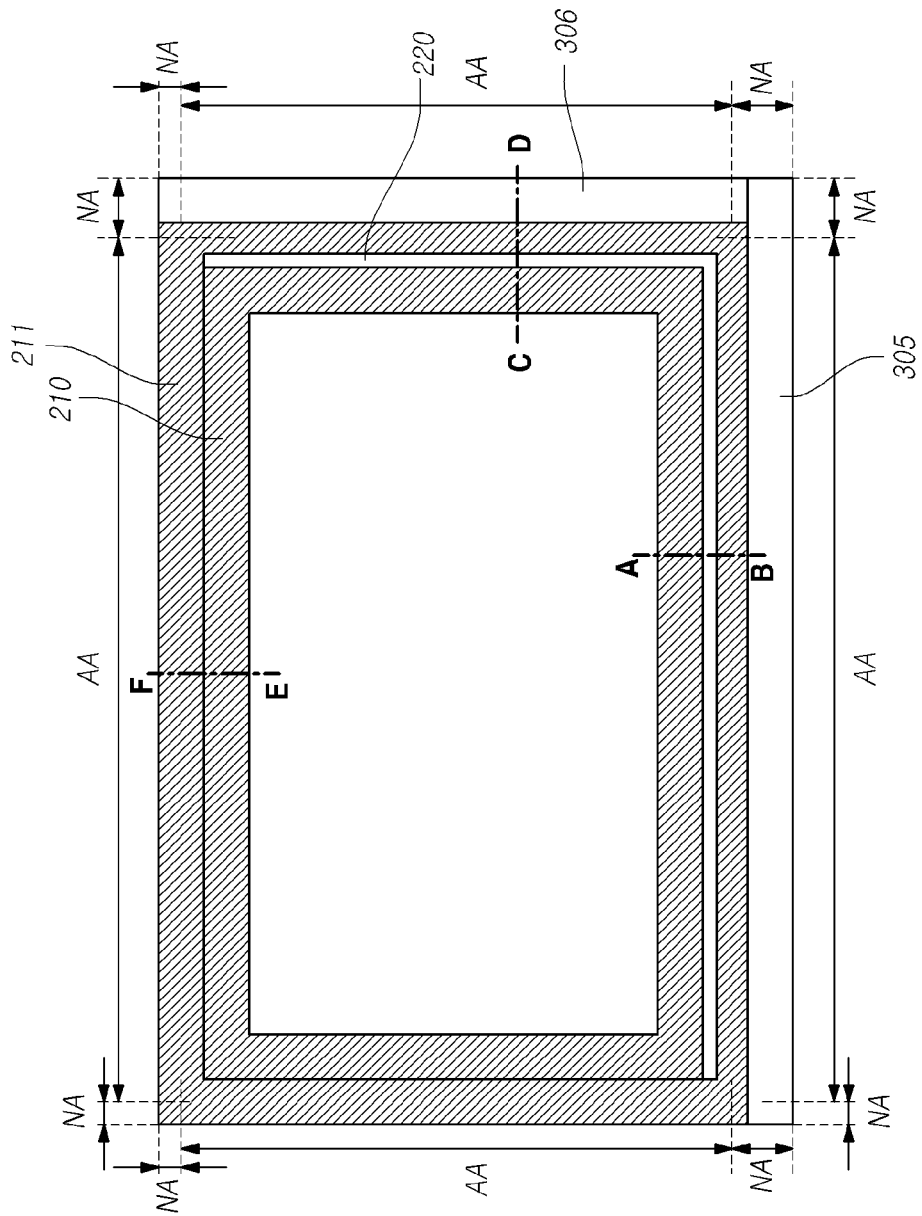
FIG. 2 is a plan view illustrating a display device according to a first exemplary embodiment.

Hereinafter, a display device according to a first exemplary embodiment will be described with reference to FIG. 2 to FIG. 9. FIG. 2 is a plan view illustrating the display device according to the first embodiment.

Referring to FIG. 2, the display device according to the first embodiment includes an active area AA and a non-active area NA. The non-active area NA may be an area surrounding the active area AA. The active area AA may be defined as an area in which images are displayed, while the non-active area NA may be defined as an area in which images are not displayed.

The active area AA includes a plurality of pixels. Each of the pixels may include a plurality of subpixels, each of which is able to generate a specific wavelength of light. On a portion of a substrate corresponding to each of the subpixels, at least one TFT and at least one pixel electrode may be disposed. A color filter layer may be disposed on one surface of another substrate to face the pixel electrode. In addition, a liquid crystal layer including a plurality of liquid crystal molecules is formed between the two substrates.

A plurality of voltage lines may be disposed in the non-active area NA. Circuit sections 305 and 306 are disposed in the non-active area NA. The circuit sections 305 and 306 include an antistatic circuit for preventing static electricity that would otherwise be generated by a plurality of voltage lines and integrated circuits (ICs) for applying signals to the plurality of voltage lines.

A first black matrix 210 is disposed on the peripheral portions of the active area AA. Although FIG. 2 illustrates the configuration in which the first black matrix 210 is disposed on the peripheral portions of the active area AA, the first black matrix 210 may be further disposed within the active area AA.

The first black matrix 210 may be disposed to overlap the color filter layer. A second black matrix 211 is disposed around the first black matrix 210. The second black matrix 211 may extend from the active area AA to the non-active area NA.

In addition, when viewed in the plane, on at least one side of the active area AA, the second black matrix 211 may be spaced apart from the first black matrix 210. That is, at least one side of the active area AA may have a gap 220 between the first black matrix 210 and the second black matrix 211.

For example, as illustrated in FIG. 2, the gap 220 may be formed on one side of the active area AA corresponding to a peripheral portion of the display device on which the first circuit section 305 including source driver ICs is disposed.

In addition, the gap 220 may also be formed on the other side of the active area AA, corresponding to a peripheral portion of the display device on which the second circuit section 306 including gate driver ICs is disposed.

Figure 3:
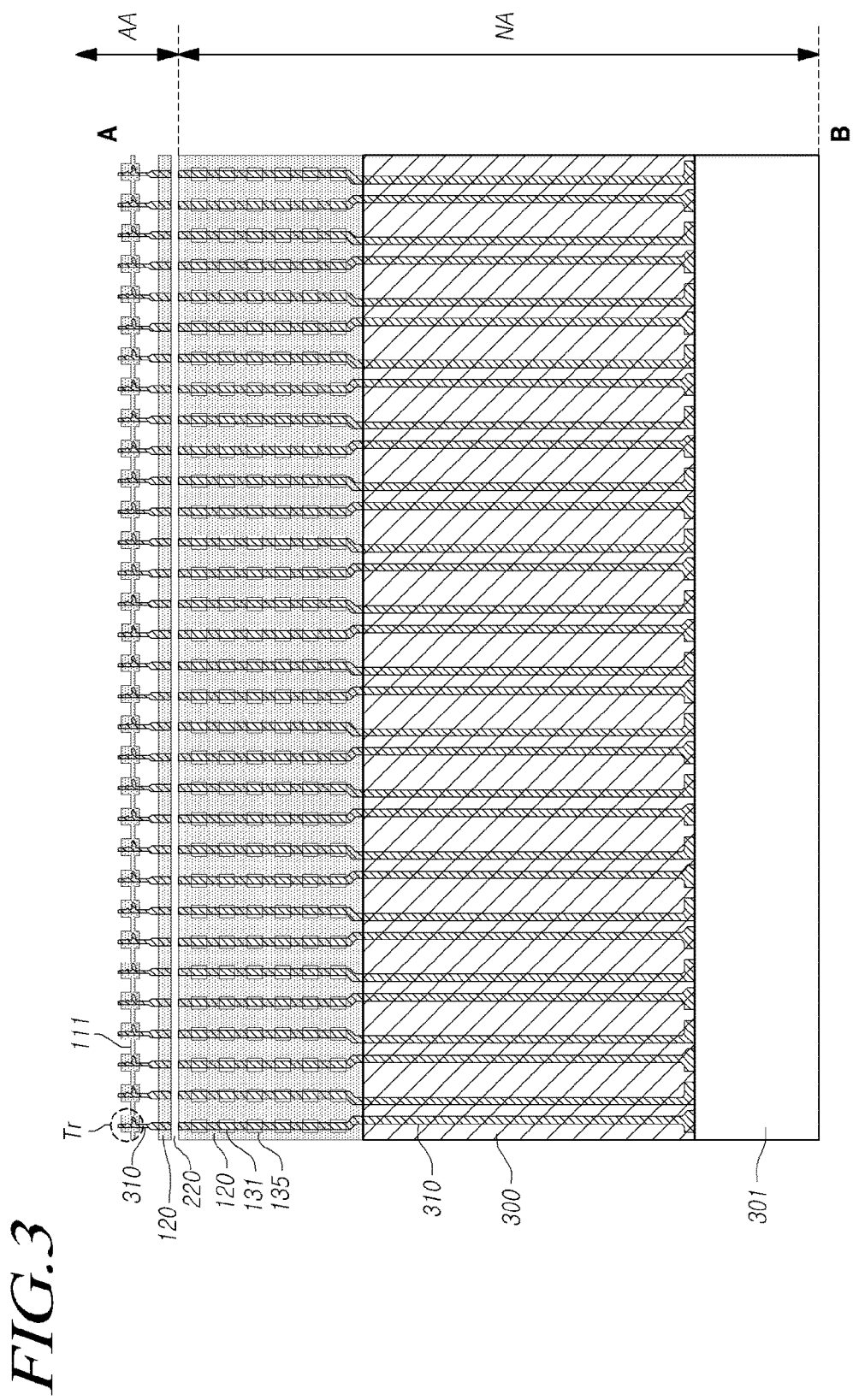
FIG. 3 is a schematic cross-sectional view of the display device according to the first exemplary embodiment, taken along line A-B in FIG. 2.

Hereinafter, the configuration having the gap 220 formed on one side of the active area AA, corresponding to the peripheral portion on which the first circuit section 305 including the source driver ICs is disposed, will be described with reference to FIG. 3. FIG. 3 is a schematic cross-sectional view of the display device according to the first exemplary embodiment, taken along line A-B in FIG. 2.

Referring to FIG. 3, the display device according to the first embodiment is divided into an active area AA and a non-active area NA. In the active area AA, a plurality of TFTs Tr are disposed on a bottom surface. Each of the TFTs Tr includes a gate electrode, an active layer, a source electrode, and a drain electrode. The gate electrode may diverge from a gate line 111, while the source electrode may diverge from a corresponding data line 131 among a plurality of data lines 131 arranged to intersect the gate line 111.

The plurality of data lines 131 disposed in the active area AA may extend to the non-active area NA. In the outermost portion of the active area AA and the non-active area NA, a common voltage supply line 120 is disposed below the plurality of data lines 131. The common voltage supply line 120 may be bar-shaped.

The common voltage supply line 120 may have a plurality of open portions 135 to reduce or prevent the formation of static electricity or capacitance between the data lines 131 and the common voltage supply line 120. In addition, the common voltage supply line 120 may be connected to a common electrode (not shown) disposed in the active area AA.

The common voltage supply line 120 may be disposed on the same layer as the gate line 111 and may be formed of the same material as the gate line 111. That is, the common voltage supply line 120 may be disposed below the data lines 131 in the active area AA and the non-active area NA.

When the common voltage supply line 120 is disposed on the same layer and is formed of the same material as the data line 131, a short circuit can be occurred between the common voltage supply line 120 and the data lines 131. To prevent such a problem, the common voltage supply line 120 may be formed of the same layer as the gate line 111 disposed at a peripheral portion of the display panel on which a source driver IC 301 is disposed.

An antistatic circuit section 300 is disposed below the common voltage supply line 120. The antistatic circuit section 300 may include a plurality of TFTs (not shown in FIG. 3).

The source driver IC 301 is disposed below the antistatic circuit section 300. The source driver IC 301 applies signals to a plurality of source electrodes and a plurality of drain electrodes disposed in the active area AA and the non-active area NA through the plurality of data lines 131.

A top substrate is disposed in the outermost portion of the active area AA to face a bottom substrate, and may have a gap 220 in a portion of an area corresponding to an area in which the common voltage supply line 120 is disposed.

Figure 4:
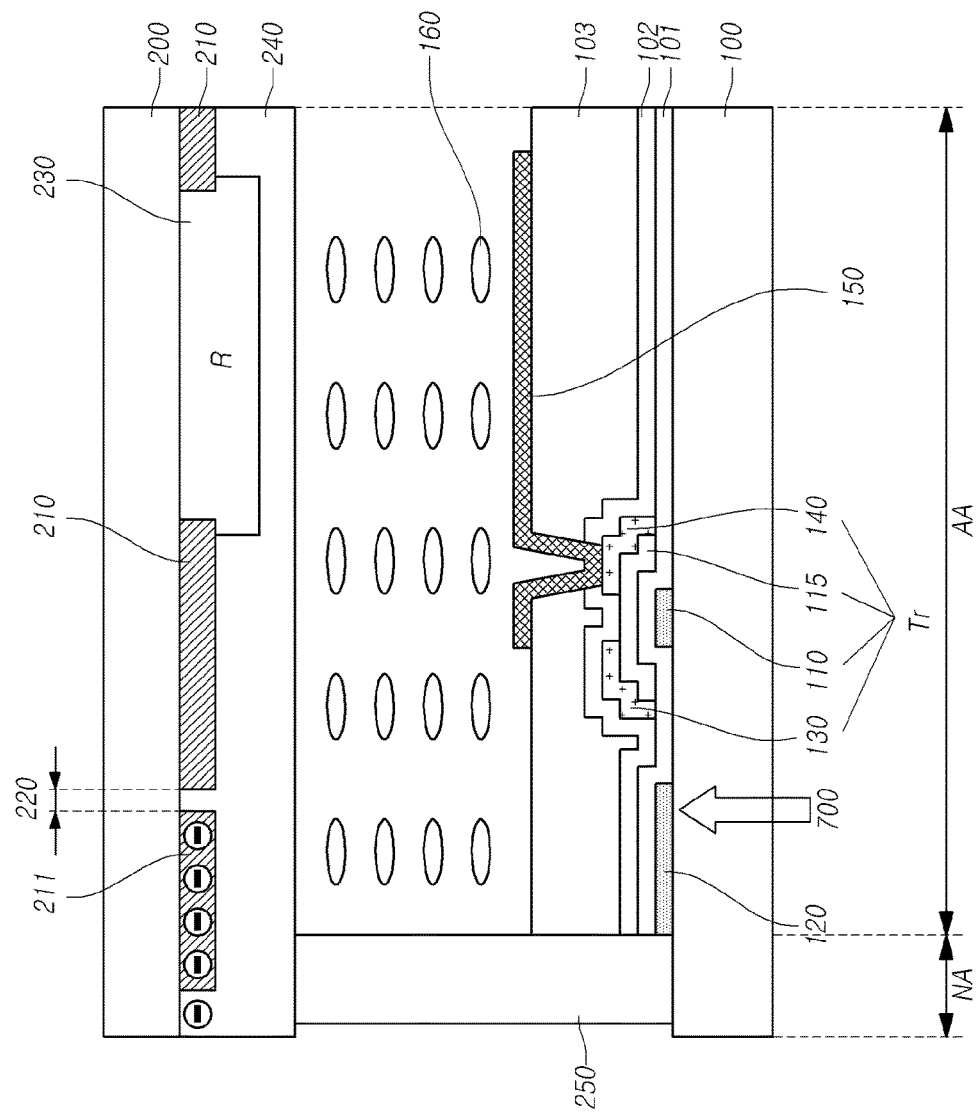
FIG. 4 is a cross-sectional view illustrating an outermost portion of an active area and a portion of a non-active area adjacent to the outermost portion of the active area in the display device according to the first exemplary embodiment.

Hereinafter, this configuration will be described with reference to the specific cross-section of the display device according to the first embodiment. FIG. 4 is a cross-sectional view illustrating an outermost portion of the active area and a portion of the non-active area adjacent to the outermost portion of the active area in the display device according to the first embodiment.

Referring to FIG. 4, the display device according to the first embodiment includes a first substrate 100 and a second substrate 200. Liquid crystal molecules 160 are sandwiched between the first substrate 100 and the second substrate 200. A seal 250 is disposed on the peripheral portions of the first substrate 100 and the second substrate 200.

The first substrate 100 is divided into an active area AA and a non-active area NA. A thin film transistors (TFT) Tr is illustrated as being disposed on the active area AA of the first substrate 100.

A single subpixel may include at least one TFT. The subpixel is driven through the TFT, whereby light transferred from a backlight unit (not shown) can be converted into light representing a color corresponding to that of the subpixel.

The TFT Tr includes a gate electrode 110, an active layer 115, a source electrode 130, and a drain electrode 140. A first metal layer 120 is disposed in a portion of the active area AA. The first metal layer 120 is disposed on the same layer as the gate electrode 110 and is spaced apart from the gate electrode 110.

The first metal layer 120 may be formed of the same material as the gate electrode 110. Specifically, the first metal layer 120 and the gate electrode 110 may be formed of an opaque material. For example, the first metal layer 120 and the gate electrode 110 may be formed of one of copper (Cu), molybdenum (Mo), aluminum (Al), silver (Ag), titanium (Ti), and alloys thereof.

FIG. 4 illustrates the configuration in which the first metal layer 120 and the gate electrode 110 are formed as a single layer. Alternatively, the first metal layer 120 and the gate electrode 110 may be formed as a plurality of layers.

The configuration of the first metal layer 120 may be the same as that of the common voltage supply line 120 illustrated in FIG. 3. The first metal layer 120 may be connected to a common electrode (not shown) disposed in the active area AA. That is, the first metal layer 120 may be disposed on the same layer and formed of the same material as the gate line 111 (see FIG. 3). Thus, without any additional process, the common voltage supply line 120 can prevent light leakage which would otherwise occur in the outermost portion of the active area AA.

A gate insulating film 101 is disposed on the first metal layer 120 and the gate electrode 110, and the active layer 115 is disposed on the gate insulating film 101 to overlap the gate electrode 110. The source electrode 130 and the drain electrode 140 are disposed on the active layer 115 to be spaced apart from each other. A protective film 102 is disposed on the source electrode 130 and the drain electrode 140, and a planarization film 103 is disposed on the protective film 102.

A pixel electrode 150 is disposed on the planarization film 103 such that the pixel electrode 150 is connected to the drain electrode 140 through a contact hole formed in the planarization film 103. In addition, a first orientation film (not shown) may be disposed on the pixel electrode 150.

The second substrate 200 is disposed to face the first substrate 100. Black matrices 210 and 211, a color filter layer 230, and an overcoat layer 240 are disposed on one surface of the second substrate 200.

Specifically, a plurality of first black matrices 210 preventing color mixing between subpixels are disposed on one surface of the second substrate 200 in the active area AA. When viewed in the cross-section, the plurality of first black matrices 210 may be spaced apart from each other on the second substrate 200. The first black matrix 210 may prevent color mixing between different subpixels.

The color filter layer 230 is disposed in the gap formed in the first black matrices 210. The color filter layer 230 may be disposed in the gap formed in the first black matrices 210 such that the color filter layer 230 overlaps portions of the top surfaces of the first black matrices 210.

FIG. 4 illustrates the configuration in which the color filter layer 230 is a red (R) color filter layer. The display device according to the first embodiment is not limited thereto and may include a configuration in which the color filter layer 230 has a different color. For example, the color filter layer 230 may be a green (G) color filter layer or a blue (B) color filter layer. In addition, the color filter layer 230 may not be provided depending on the color of light emitted by the subpixel.

The color filter layer 230 may contain a dye or a pigment. The color filter layer 230 may contain different types and amounts of dye or pigment depending on colors. When the dye or the pigment is vulnerable to an electric field, the liquid crystal molecules 160 may malfunction, thereby causing light leakage.

Figure 5:
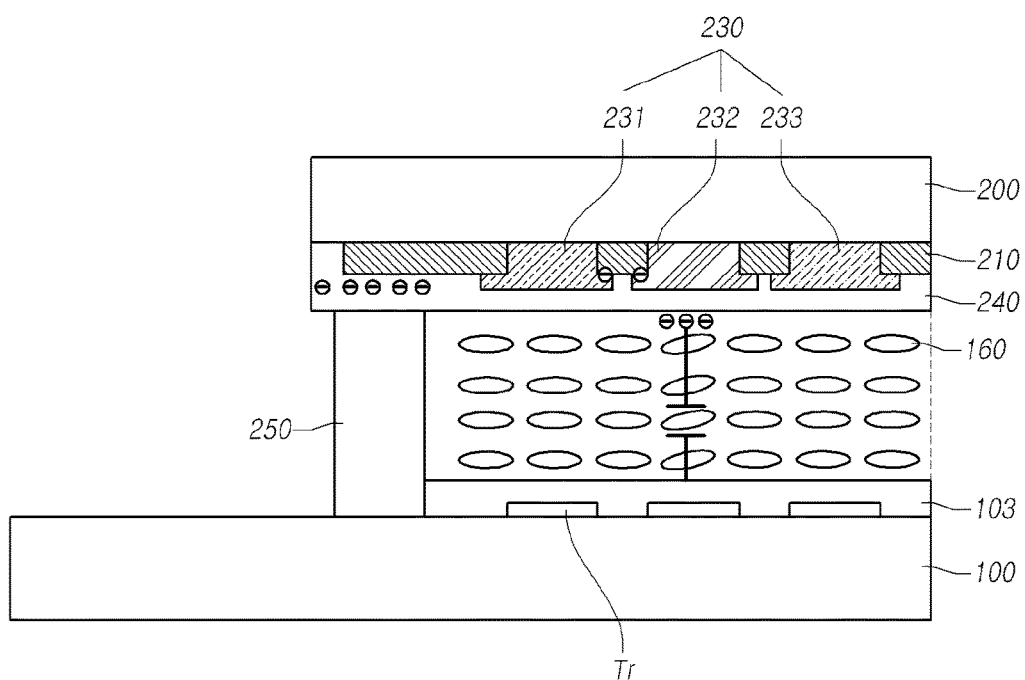
FIG. 5 is a cross-sectional view illustrating a display device according to a first comparative example.

This will be described in detail with reference to FIG. 5. FIG. 5 is a cross-sectional view illustrating a display device according to a first comparative example. The display device according to the comparative example may include the same components as the display device according to the first embodiment. In the following disclosure, descriptions of some components will be omitted, since they are identical to those of the above-described first embodiment. In addition, the same reference numerals will be used to designate the same components.

Referring to FIG. 5, a color filter layer 230 may include a red (R) color filter layer 231, a green (G) color filter layer 232, and a blue (B) color filter layer 233. The red color filter layer 231, the green color filter layer 232, and the blue color filter layer 233 may contain different types of dyes or pigments and may contain different amounts of dyes or pigments.

Light leakage occurs in a green (G) subpixel in which the green color filter layer 232 is disposed. Specifically, electric charges may migrate to the conductive material of a second substrate 200 through an electrical line connected to the ground. At this time, electric charges may arrive at the overcoat layer 240 having a low level of resistance, and in this case, may also arrive at a black matrix 210 having a low level of resistance.

Since electric charges move through the black matrices 210, an electric field may be transferred to the color filter layer 230. Since pigments contained in the green color filter layer 232 are significantly vulnerable to an electric field, this can cause liquid crystal molecules 160 disposed in the green subpixel to malfunction.

Specifically, even in the case in which no electric field is applied to the green subpixel, the liquid crystal molecules 160 disposed in the green subpixel in the periphery of the active area may be driven by an electric field generated by the black matrices 210, whereby light leakage may occur.

Figure 6:
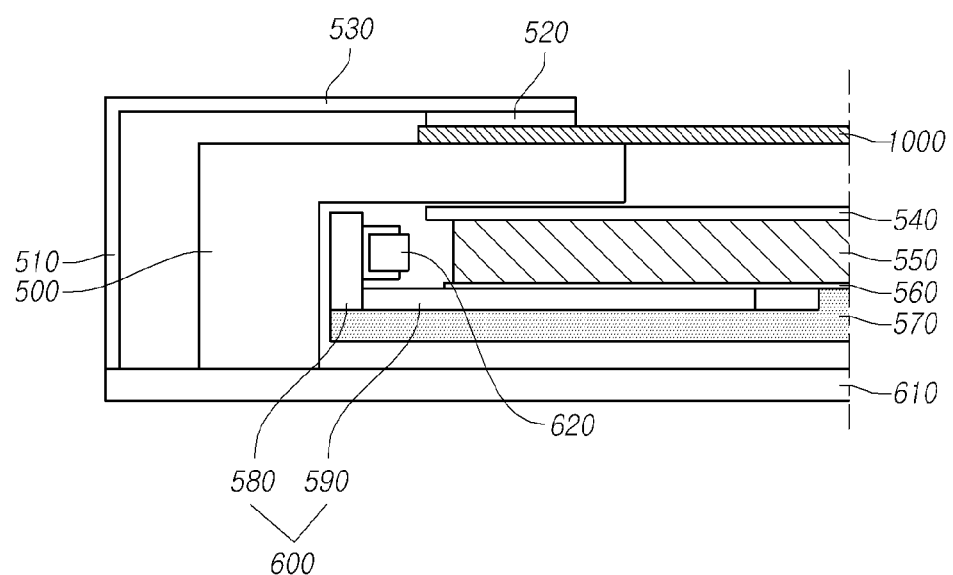
FIG. 6 is a cross-sectional view illustrating a display device according to a second comparative example.

To overcome this problem, an approach of preventing light leakage in the green subpixel of the display panel 1000 using a guide panel has been made. This approach will be discussed with reference to FIG. 6 as follows. FIG. 6 is a cross-sectional view illustrating a display device according to a second comparative example.

The display device illustrated in FIG. 6 includes a display panel 1000 and a backlight unit. The backlight unit includes a guide panel 500, a pad 520, an optical sheet 540, a light guide plate 550, a reflector sheet 560, a printed circuit board (PCB) 600, an upper cover 530, a lower cover 570, a front cover 510, a cover bottom 610, and a light source 620.

The guide panel 500 is disposed to overlap a portion of the rear surface of the display panel 1000. Specifically, the guide panel 500 is disposed to overlap the periphery of an active area of the display panel 1000. Since the periphery of the active area is covered with the guide panel 500, light from the backlight unit can be blocked.

Since light is not transferred to the periphery of the active area, it is possible to prevent light leakage when liquid crystal molecules disposed in the green subpixel in the periphery of the active area malfunction. However, although the guide panel 500 covers the peripheral portions of the active area, there still is a problem in that light leakage may occur depending on the viewing angle.

In contrast, in the display device according to the first embodiment illustrated in FIG. 4, the second black matrix 211 is disposed in the outermost portion of the first black matrix 210 and a portion of the non-active area NA adjacent to the outermost portion of the active area AA.

The second black matrix 211 is spaced apart from the adjacent first black matrix 210 disposed in the active area AA. Specifically, the outermost portion of the active area AA has a gap 220 between the first black matrix 210 and the second black matrix 211. The second black matrix 211 may be disposed in at least one outermost portion of the active area AA, whereby the gap 220 may be formed in the at least one outermost portion of the active area AA.

As described above, in the display device according to the first embodiment, the first black matrix 210 and the second black matrix 211 are disposed in the outermost portion of the active area AA to be spaced apart from each other, whereby electric charges transferred from the external source are prevented from being transferred to the first black matrix 210 in the active area AA along the second black matrix 211.

Since electric charges are prevented from being transferred to the first black matrix 210, malfunctioning of liquid crystal molecules in the green subpixel from malfunctioning can be prevented.

The first metal layer 120 is disposed on a portion of the first substrate 100 corresponding to the gap 220 between the first black matrix 210 and the second black matrix 211. The first metal layer 120 is disposed on the same layer as the gate electrode 110 of the TFT Tr. With this configuration, light 700 from the backlight unit disposed on the rear surface of the first substrate 100 can be absorbed to the first metal layer 120 formed of an opaque metal, thereby preventing light leakage that would otherwise be caused by the gap 220.

A width of the gap 220 between the first black matrix 210 and the second black matrix 211 may in the range of 1 μm to 200 μm. When the width of the gap 220 is less than 1 μm, liquid crystal molecules in the green subpixel adjacent to the outermost portion of the active area AA may malfunction. When the width of the gap 220 is greater than 200 μm, the width of the first metal layer 120 in the active area AA, i.e. the first common voltage supply line, is increased, whereby light incident to the rear surface of the first substrate 100 is absorbed to a wider area. That is, the portion of the active area AA, on which images are displayed, is reduced.

Figure 7:
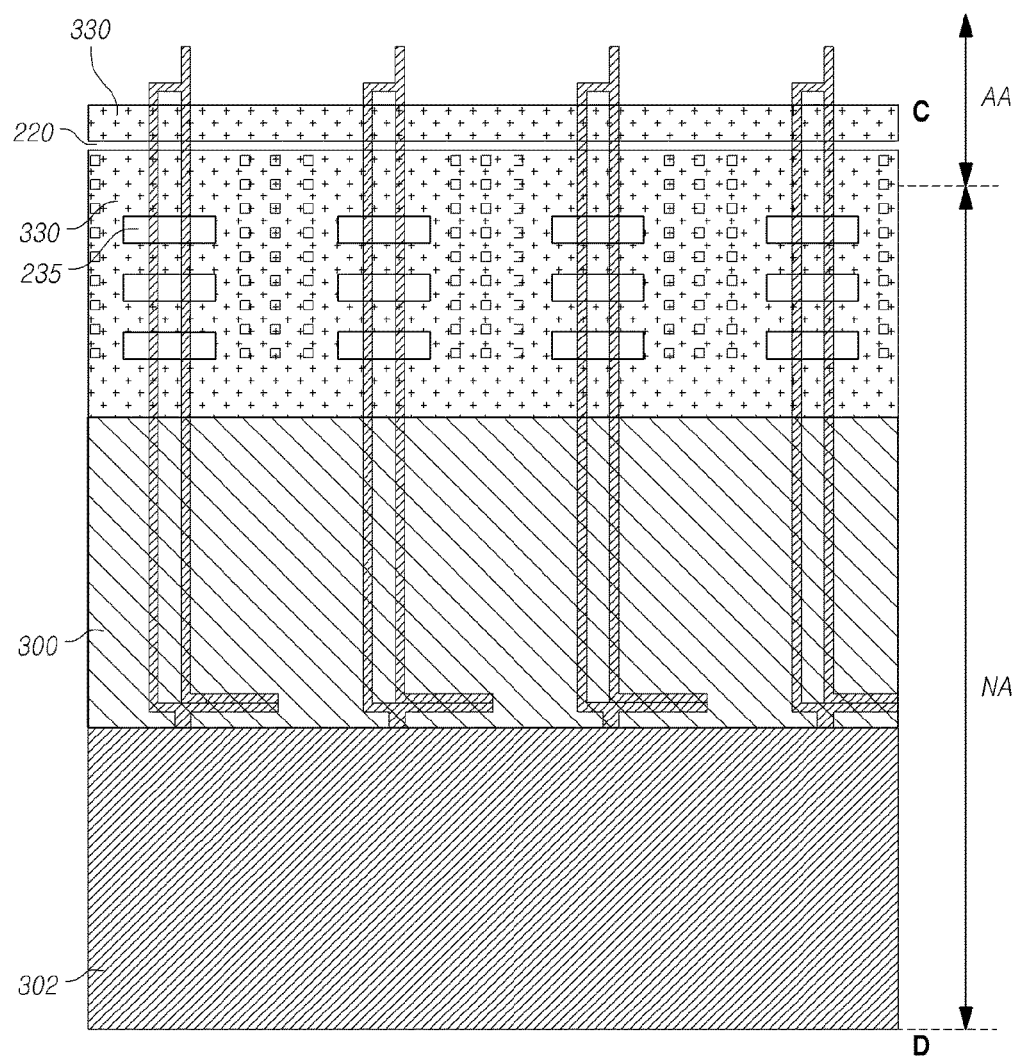
FIG. 7 is a cross-sectional view of the display device according to the first exemplary embodiment, taken along line C-D in FIG. 2.
Figure 8:
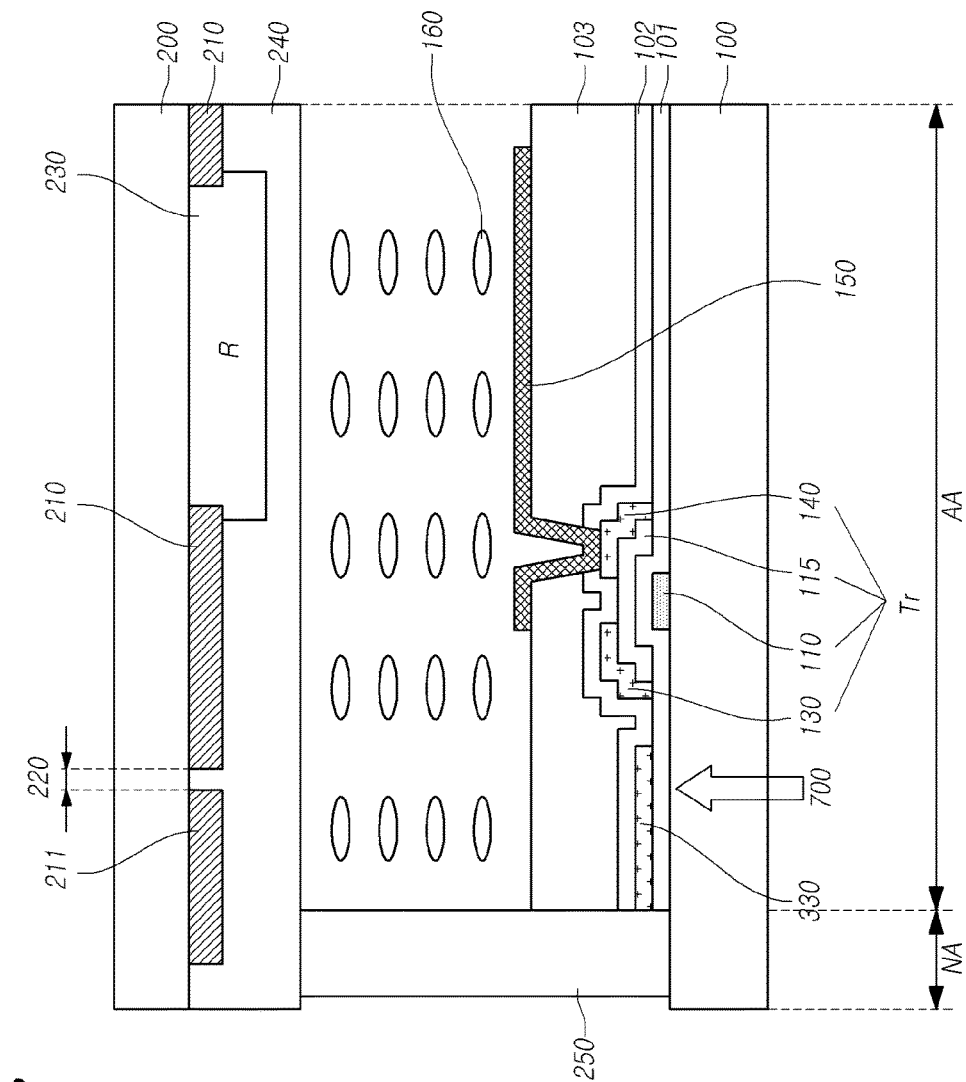
FIG. 8 is a cross-sectional view illustrating an outermost portion of the active area and a portion of the non-active area adjacent to the outermost portion of the active area in the display device according to the first exemplary embodiment.

Hereinafter, a configuration in which a black matrix has a gap in a portion of an active area corresponding to a peripheral portion of the display device on which gate driver ICs are disposed will be described with reference to FIG. 7 and FIG. 8. FIG. 7 is a cross-sectional view of the display device according to the first exemplary embodiment, taken along line C-D in FIG. 2. FIG. 8 is a cross-sectional view illustrating an outermost portion of the active area and a portion of the non-active area adjacent to the outermost portion of the active area in the display device according to the first exemplary embodiment.

FIG. 7 and FIG. 8 may include the same components as those illustrated in FIG. 3 and FIG. 4. Descriptions of the same components as those illustrated in FIG. 3 and FIG. 4 may be omitted. In addition, the same reference numerals will be used to designate the same components.

Referring to FIG. 7 and FIG. 8, the display device according to the first embodiment is divided into the active area AA and the non-active area NA. The gate line 111 disposed on the bottom substrate in the active area AA may diverge from a gate driver IC disposed on the outermost portion of the display device to extend to the active area AA. That is, the gate line 111 diverges from the gate driver IC 302 and extends to the active area AA through the antistatic circuit section 300 and a second common voltage supply line 330.

The second common voltage supply line 330 may be bar-shaped. The second common voltage supply line 330 may be disposed on the same layer as the data line disposed to intersect the gate line 111 in the active area AA and may be formed of the same material as the data line. That is, the second common voltage supply line 330 may be disposed above the gate line 111 in the active area AA and the non-active area NA.

When the second common voltage supply line 330 is formed of the same material as the gate line 111, a short circuit can be caused between the second common voltage supply line 330 and the gate line 111. To prevent the short circuit, the second common voltage supply line 330 may be disposed on the same layer as the data line in a peripheral portion of the display panel on which the gate driver IC 302 is disposed.

In addition, to prevent static electricity or capacitance between the second common voltage supply line 330 and the gate line 111, the second common voltage supply line 330 may have a plurality of holes 235 in a portion thereof overlapping the gate line 111.

The top substrate disposed in the outermost portion of the active area AA to face the bottom substrate has the black matrix gap 220 in a portion thereof corresponding to a portion on which the second common voltage supply line 330 is disposed.

Hereinafter, this configuration will be described in detail with reference to FIG. 8. Referring to FIG. 8, the gap 220 is formed between the first black matrix 210 and the second black matrix 211 in the outermost portion of the active area AA. In addition, a second metal layer 330 is disposed on a portion of the first substrate 100 corresponding to the gap 220.

The second metal layer 330 may be disposed on the same layer and formed of the same material as the source electrode 130 and the drain electrode 140 of the TFT Tr. Specifically, the second metal layer 330, the source electrode 130, and the drain electrode 140 may be formed of an opaque metal. For example, the second metal layer 330, the source electrode 130, and the drain electrode 140 may be formed of one of copper (Cu), molybdenum (Mo), aluminum (Al), silver (Ag), titanium (Ti), and alloys thereof.

Since the second metal layer 330 is formed of an opaque metal, light 700 incident to the rear surface of the first substrate 100 can be absorbed. It is thereby possible to prevent the gap 220 from causing light leakage in the outermost portion of the active area AA.

The second metal layer 330 may be the same component as the second common voltage supply line 330 illustrated in FIG. 7. The second metal layer 330 may be connected to a common electrode (not shown) disposed in the active area AA. In this regard, the second metal layer 330, the same component as the second common voltage supply line 330, is disposed in the portion corresponding to the gap 220, whereby light leakage that would otherwise be caused by the gap 220 can be prevented without adding a separate metal layer.

The display device according to the first embodiment is not limited thereto, but may have any configuration in which a component able to absorb light is disposed on a portion of the first substrate 100 corresponding to the gap 220.

Figure 9:
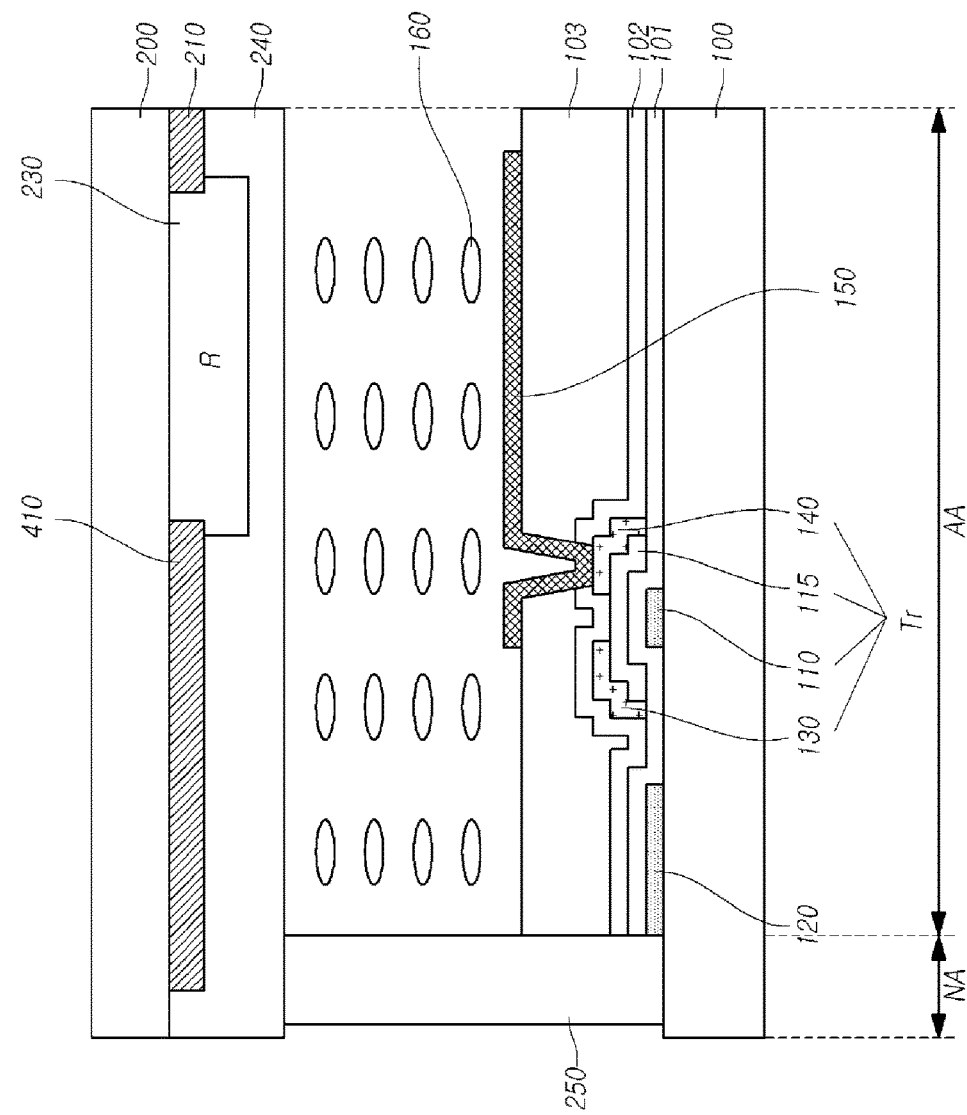
FIG. 9 is a cross-sectional view of the display device according to the first exemplary embodiment, taken along line E-F in FIG. 2.

Hereinafter, an area in the display device according to the first embodiment, in which no gap formed by the black matrix is present, will be described with reference to FIG. 9. FIG. 9 is a cross-sectional view of the display device according to the first exemplary embodiment, taken along line E-F in FIG. 2.

FIG. 9 may include the same components as those illustrated in FIG. 4 and FIG. 8. Descriptions of the same components as those illustrated in FIG. 4 and FIG. 8 may be omitted. In addition, the same reference numerals will be used to designate the same components.

Referring to FIG. 9, a black matrix 410 is disposed on the outermost portion of an active area AA of the display device according to the first exemplary embodiment. The black matrix 410 may extend to a non-active area NA. Unlike the areas illustrated in FIG. 4 and FIG. 8, a gap may not be formed by the black matrix.

As illustrated in FIG. 2, in the display device according to the first embodiment, the gap 220 formed by the black matrix may be positioned on a peripheral portion of the display panel corresponding to an area in which the source driver IC 301 or the gate driver IC 302 is disposed. Due to this configuration, liquid crystal molecules in specific sub-pixels adjacent to the outermost portion of the active area AA can be prevented from malfunctioning.

Figure 10:
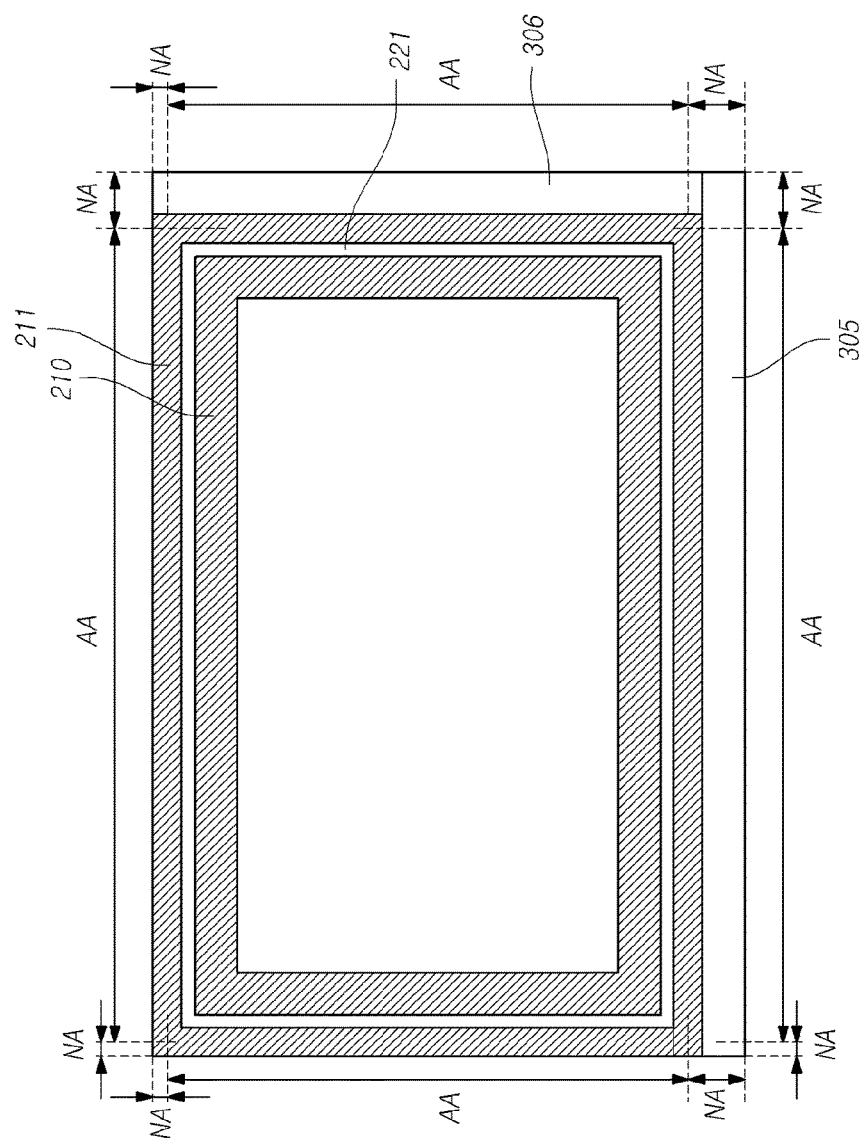
FIG. 10 is a plan view illustrating a display device according to a second exemplary embodiment.

Hereinafter, a display device according to a second exemplary embodiment will be described with reference to FIG. 10. FIG. 10 is a plan view illustrating the display device according to the second embodiment.

The display device according to the second embodiment may include the same components as those of the display device according to the first embodiment. Descriptions of the same components as those of the display device according to the first embodiment may be omitted. In addition, the same reference numerals will be used to designate the same components.

Referring to FIG. 10, the display device according to the second embodiment has a gap 221 on four peripheral portions thereof, the gap 221 being formed by a first black matrix 210 and a second black matrix 211.

Although not shown in the drawing, a first or second metal layer may be disposed on a bottom substrate of the display panel, in an area corresponding to the gap 221. The first metal layer may be disposed on the same layer as gate metal elements of TFTs, while the second metal layer may be disposed on the same layer as source electrodes and drain electrodes of the TFTs. The first and second metal layers may be formed of an opaque material.

This configuration can prevent light leakage that would otherwise be caused by malfunctioning liquid crystal molecules on the four peripheral portions of the display panel. In addition, the first or second metal layer disposed in the area corresponding to the gap 221 can prevent light leakage that would otherwise be caused by the gap 221.

As set forth above, light leakage that would otherwise be caused by the gap 221 between the first and second black matrices 210 and 211 is prevented using the first or second metal layer. Unlike the approach of preventing light leakage using a mechanical structure, such as a guide panel, it is possible to prevent light leakage regardless of viewing angles.

The features, structures, and effects described in the present disclosure are included in at least one embodiment but are not necessarily limited to a particular embodiment. A person skilled in the art can apply the features, structures, and effects illustrated in the particular embodiment to another embodiment by combining or modifying such features, structures, and effects. It should be understood that all such combinations and modifications are included within the scope of the present disclosure.

Although the present disclosure have been described for illustrative purposes, a person skilled in the art will appreciate that various modifications and applications are possible without departing from the essential characteristics of the present disclosure. For example, the specific components of the exemplary embodiments may be variously modified.

What is claimed is:

1. A liquid crystal display device comprising:
   a display panel having an active area and a non-active area;
   a first black matrix in the active area;
   a second black matrix on at least a peripheral portion of the display panel and being spaced apart from the first black matrix, and the second black matrix positioned in the active area and a portion of the non-active area; and
   an opaque layer corresponding to a gap between the first black matrix and the second black matrix.

2. The liquid crystal display device according to claim 1, wherein the gap is positioned in the active area.

3. The liquid crystal display device according to claim 2, wherein the gap has a width ranging from 1 μm to 200 μm.

4. The liquid crystal display device according to claim 1, wherein the opaque layer is formed of a metallic material.

5. The liquid crystal display device according to claim 1, wherein the metallic material includes one of copper, molybdenum, aluminum, silver, titanium, and alloys thereof.

6. The liquid crystal display device according to claim 1, further comprising a common voltage supply line and a driver integrated circuit on the peripheral portion of the display panel on which the second black matrix is disposed.

7. The liquid crystal display device according to claim 6, wherein the common voltage supply line is disposed in an outermost portion of the active area corresponding to the gap between the first black matrix and the second black matrix.

8. The liquid crystal display device according to claim 6, wherein the common voltage supply line is bar-shaped.

9. The liquid crystal display device according to claim 1, wherein the peripheral portion of the display panel is an outermost portion of the active area, so that electric charges transferred from an external source are prevented from being transferred to the first black matrix in the active area along the second black matrix.

10. The liquid crystal display device according to claim 1, wherein the second black matrix surrounds the first black matrix.

11. A liquid crystal display device comprising:
    a first substrate having an active area and a non-active area;
    a first metal layer or a second metal layer on the first substrate and positioned in an outermost portion of the active area;

a second substrate facing the first substrate;
a first black matrix on one surface of the second substrate and positioned in the active area; and
a second black matrix spaced apart from the first black matrix with a gap and positioned in the outermost portion of at least one side of the active area, wherein the first metal layer or the second metal layer is disposed to correspond to the gap.

12. The liquid crystal display device according to claim 11, wherein the gap is positioned in the active area.

13. The liquid crystal display device according to claim 11, wherein the gap has a width ranging from 1 μm to 200 μm.

14. The liquid crystal display device according to claim 11, wherein the first metal layer includes a first common voltage supply line and the second metal layer includes a second common voltage supply line.

15. The liquid crystal display device according to claim 11, further comprising a plurality of thin-film transistors disposed on the first substrate, each of the plurality of thin-film transistors including a gate electrode, wherein the first metal layer is formed of the same material as the gate electrode.

16. The liquid crystal display device according to claim 11, further comprising a plurality of thin-film transistors disposed on the first substrate, each of the plurality of thin-film transistors including a source electrode and a drain electrode,
wherein the second metal layer is formed of the same material as the source electrode and the drain electrode.

17. The liquid crystal display device according to claim 11, wherein the first metal layer and the second metal layer are formed of an opaque metallic material.

18. The liquid crystal display device according to claim 17, wherein the metallic material includes one of copper, molybdenum, aluminum, silver, titanium, and alloys thereof.

19. The liquid crystal display device according to claim 11, wherein electric charges transferred from an external source are prevented from being transferred to the first black matrix in the active area along the second black matrix.

20. The liquid crystal display device according to claim 11, wherein the second black matrix surrounds the first black matrix.

* * * * *